(12) United States Patent
Ataie

(10) Patent No.: US 11,368,182 B2
(45) Date of Patent: Jun. 21, 2022

(54) METHOD AND SYSTEM FOR SPREAD SPECTRUM CODE ACQUISITION

(71) Applicant: RAM Photonics LLC, San Diego, CA (US)

(72) Inventor: Vahid Ataie, San Diego, CA (US)

(73) Assignee: RAM Photonics LLC, San Diego, CA (US)

( * ) Notice: Subject to any disclaimer, the term of this patent is extended or adjusted under 35 U.S.C. 154(b) by 0 days.

(21) Appl. No.: 17/232,358

(22) Filed: Apr. 16, 2021

(65) Prior Publication Data

US 2021/0314019 A1 Oct. 7, 2021

Related U.S. Application Data

(60) Continuation of application No. 16/931,739, filed on Jul. 17, 2020, now Pat. No. 11,005,520, which is a
(Continued)

(51) Int. Cl.
| | |
|---|---|
| *H04B 1/7075* | (2011.01) |
| *H04B 1/7085* | (2011.01) |
| *H04J 14/02* | (2006.01) |
| *H04L 7/00* | (2006.01) |

(Continued)

(52) U.S. Cl.
CPC ....... *H04B 1/70754* (2013.01); *H04B 1/7085* (2013.01); *H04B 10/6164* (2013.01);
(Continued)

(58) Field of Classification Search
CPC ............ H04B 1/70754; H04B 10/6164; H04B 1/7085; H04B 2201/7073;
(Continued)

(56) References Cited

U.S. PATENT DOCUMENTS

| | | | |
|---|---|---|---|
| 5,719,899 A | * | 2/1998 | Thielecke ............ H04B 1/7107 370/320 |
| 5,999,561 A | | 12/1999 | Naden et al. |

(Continued)

FOREIGN PATENT DOCUMENTS

WO 2017078561 A1 5/2017

OTHER PUBLICATIONS

A. Fedorov, V. Lyashev and L. Rapoport, "Fast algorithm of LTE RACH detection based on sparse fourier transform," *2075 Third International Conference on Digital Information, Networking, and Wireless Communications(DINWC)*, Moscow, Feb. 2015, pp. 77-82. See Sections I, II and IV.C.

(Continued)

*Primary Examiner* — Kabir A Timory
(74) *Attorney, Agent, or Firm* — Kilpatrick Townsend & Stockton LLP

(57) ABSTRACT

A code acquisition module for a direct sequence spread spectrum (DSSS) receiver includes: a Sparse Discrete Fourier transform (SDFT) module configured to perform an SDFT on a finite number of non-uniformly distributed frequencies comprising a preamble of a received DSSS frame to calculate Fourier coefficients for the finite number of non-uniformly distributed frequencies; a multiplier configured to multiply the Fourier coefficients for the finite number of non-uniformly distributed frequencies of the received DSSS frame by complex conjugate Fourier coefficients for the finite number of non-uniformly distributed frequencies to generate a cross-correlation of the received DSSS frame and the complex conjugate Fourier coefficients; and a filter module configured to input the cross-correlation and output a delay estimation for the received DSSS frame.

6 Claims, 11 Drawing Sheets

Related U.S. Application Data division of application No. 16/205,097, filed on Nov. 29, 2018, now Pat. No. 10,756,776.

(60) Provisional application No. 62/593,803, filed on Dec. 1, 2017.

(51) Int. Cl.
*H04B 10/61* (2013.01)
*H04B 1/69* (2011.01)

(52) U.S. Cl.
CPC ........ *H04J 14/0205* (2013.01); *H04L 7/0041* (2013.01); *H04L 7/0075* (2013.01); *H04B 2001/6908* (2013.01); *H04B 2201/7073* (2013.01); *H04B 2210/006* (2013.01)

(58) Field of Classification Search
CPC ...... H04B 2210/006; H04B 2001/6908; H04L 7/0041; H04L 7/0075; H04J 14/0205
See application file for complete search history.

(56) References Cited

U.S. PATENT DOCUMENTS

| | | | |
|---|---|---|---|
| 6,154,443 A * | 11/2000 | Huang | ................. H04B 1/7093 370/210 |
| 6,714,557 B1 | 3/2004 | Smith et al. | |
| 10,756,776 B2 | 8/2020 | Ataie | |
| 11,005,520 B2 | 5/2021 | Ataie | |
| 2008/0181170 A1* | 7/2008 | Branlund | ............. H04B 1/7103 370/328 |
| 2012/0026901 A1 | 2/2012 | Gao et al. | |
| 2013/0202014 A1 | 8/2013 | Schmidl | |
| 2013/0258961 A1 | 10/2013 | Ye | |
| 2014/0036765 A1 | 2/2014 | Fujimura et al. | |
| 2019/0173518 A1 | 6/2019 | Ataie | |

OTHER PUBLICATIONS

Shengheng, L., et al., "Sparse Discrete Fractional Fourier Transformand Its Applications," in IEEE Transactions on Signal Processing, vol. 62, No. 24, pp. 6582-6595, Dec. 15, 2014, DOI: 10.1109/TSP.2014. 2366719. See section IV and Figure 6.

W. Wang, Y. Chen, Z.Wang, J. Zhang, K. Wu and Q. Zhang, "Changing channelwithout strings: Coordination-free wideband spectrumadaptation," 2015 IEEE Conference on Computer Communications (INFOCOM), Kowloon,Apr. 26-May 1, 2015, pp. 460-468. See first complete paragraph of p. 461. Fig. 2, and Sections III, IV.A and IV.B.

First Search Report dated May 8, 2019 in United Kingdom Patent Application No. 1819562.8, 4 pages.

* cited by examiner

US 11,368,182 B2

METHOD AND SYSTEM FOR SPREAD SPECTRUM CODE ACQUISITION

CROSS-REFERENCES TO RELATED APPLICATIONS

This application is a continuation of U.S. patent application Ser. No. 16/931,739, filed Jul. 17, 2020, which is a divisional of U.S. patent application Ser. No. 16/205,097, filed Nov. 29, 2018, now issued as U.S. Pat. No. 10,756,776, which claims the benefit of U.S. Provisional Application No. 62/593,803, filed Dec. 1, 2017, the contents of which are hereby incorporated by reference in their entirety for all purposes.

BACKGROUND OF THE INVENTION

Techniques for spread spectrum code acquisition have been developed, including systems for direct sequence systems. Despite the progress made in spread spectrum code acquisition techniques, there is a need in the art for improved methods and systems related to spread spectrum code acquisition.

SUMMARY OF THE INVENTION

Apparatuses and methods for spread spectrum communication systems and coarse code acquisition in a direct sequence spread spectrum (DSSS) receiver are provided.

According to various aspects there is provided a method for synchronizing a direct sequence spread spectrum (DSSS) frame. In some aspects, the method may include: generating a preamble-codeword in a frequency domain for the DSSS frame by selecting a finite number of non-uniformly distributed frequencies corresponding to frequencies detectable by a Sparse Discrete Fourier Transform (SDFT) at which spectral peaks will occur; generating a preamble in a time domain based on the preamble-codeword; prepending the preamble to a coded data stream to form the DSSS frame; and transmitting the DSSS frame.

Each of the finite number of non-uniformly distributed frequencies may have higher spectral power than a background power spectral density of the preamble-codeword. The finite number of non-uniformly distributed frequencies may be randomly selected frequencies or specifically selected frequencies. A different preamble-codeword may be generated after the preamble-codeword has been used for a predetermined period of time.

The method may further include: receiving the DSSS frame; generating sparse Fourier coefficients of the preamble-codeword by performing the SDFT on the preamble; generating complex conjugates of the sparse Fourier coefficients based on a reference codeword; and multiplying the sparse Fourier coefficients by the complex conjugates of the sparse Fourier coefficients. The reference codeword may be the preamble-codeword agreed upon in advance between a transmitter and a receiver.

The method may further include generating a delay estimation signal by applying an iterative filtering algorithm to results of the multiplication. The method may further include generating a delay estimation signal by applying a Sparse inverse Discrete Fourier Transform (SiDFT) algorithm to results of the multiplication.

According to various aspects there is provided a code acquisition module for a direct sequence spread spectrum (DSSS) receiver. In some aspects, the code acquisition module may include: a Sparse Discrete Fourier transform (SDFT) module configured to perform an SDFT on a finite number of non-uniformly distributed frequencies included in a preamble of a received DSSS frame to calculate Fourier coefficients for the finite number of non-uniformly distributed frequencies; a multiplier configured to multiply the Fourier coefficients for the finite number of non-uniformly distributed frequencies of the received DSSS frame by complex conjugate Fourier coefficients for the finite number of non-uniformly distributed frequencies to generate a cross-correlation of the received DSSS frame and the complex conjugate Fourier coefficients; and a filter module configured to input the cross-correlation and output a delay estimation for the received DSSS frame.

The finite number of non-uniformly distributed frequencies may include sparsely allocated spectral peaks determined by a preamble-codeword. The complex conjugate Fourier coefficients may be calculated based on a reference codeword. The reference codeword may be a preamble-codeword agreed upon in advance by the DSSS receiver and a transmitter.

The filter module may be configured to accept an input signal from the multiplier, apply an iterative filtering algorithm or a Sparse inverse Discrete Fourier Transform (SiDFT) algorithm to the input signal, and output a delay estimation signal. The SDFT module, the multiplier, and the filter module may be implemented by a digital signal processor.

According to various aspects there is provided an optical/electrical code acquisition module for a direct sequence spread spectrum (DSSS) receiver. In some aspects, the optical/electrical code acquisition module may include: a first optical frequency comb configured to generate a plurality of first comb frequencies at a first frequency pitch; a second optical frequency comb configured to generate a plurality of second comb frequencies at a second frequency pitch different than the first frequency pitch; an optical modulator configured to modulate the first comb frequencies with a received DSSS signal including a preamble to generate a modulated signal having spectral copies of the DSSS signal on different optical wavelengths of the first comb frequencies, wherein the preamble includes a preamble-codeword for the DSSS signal including a selected plurality of non-uniformly distributed frequencies at which spectral peaks will occur within a communication bandwidth; an optical module configured to combine the modulated signal from the optical modulator and the second comb frequencies to generate a plurality of optical output signals; a wavelength demultiplexer configured to demultiplex the plurality of optical output signals; and a plurality of balanced detectors configured to detect only the selected plurality of non-uniformly distributed frequencies comprising the preamble-codeword at which the spectral peaks will occur. Each of the plurality of balanced detectors is configured to generate output signals corresponding to a detected frequency.

The optical/electrical code acquisition module may further include: a programmable device, for example, but not limited to, a digital signal processor, configured to accept the output signals from the plurality of balanced detectors, generate complex conjugates of the preamble-codeword based on a reference codeword, multiply the DSSS signal by the complex conjugates of the preamble-codeword, apply a filtering algorithm to the output signals, and output a delay estimation signal. The reference codeword may be the preamble-codeword agreed upon in advance between a transmitter and the DSSS receiver.

The selected plurality of non-uniformly distributed frequencies defined by the preamble-codeword may correspond to frequencies of a Sparse Discrete Fourier transform (SDFT). The plurality of balanced detectors may be configured to output signals corresponding to Fourier coefficients of the SDFT.

Numerous benefits are achieved by way of the various embodiments over conventional techniques. For example, the various embodiments provide methods and systems that can be used to overcome the limitations of conventional electronic communications systems to implement high coding-gain direct sequence spread spectrum (DSSS) systems. In some embodiments, a synthesized preamble sequence in conjunction with a Sparse Discrete Fourier Transform (SDFT) engine may enable high coding gain. In other embodiments, an optical/electrical solution using two sets of optical frequency combs may be implemented. These and other embodiments along with many of its advantages and features are described in more detail in conjunction with the text below and attached figures.

BRIEF DESCRIPTION OF THE DRAWINGS

The various embodiments now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments as set forth herein; rather, these embodiments are provided by way of illustration only and so that this disclosure will be thorough, complete and will fully convey the full scope of the embodiments to those skilled in the art.

DETAILED DESCRIPTION OF SPECIFIC EMBODIMENTS

Figure 1A:
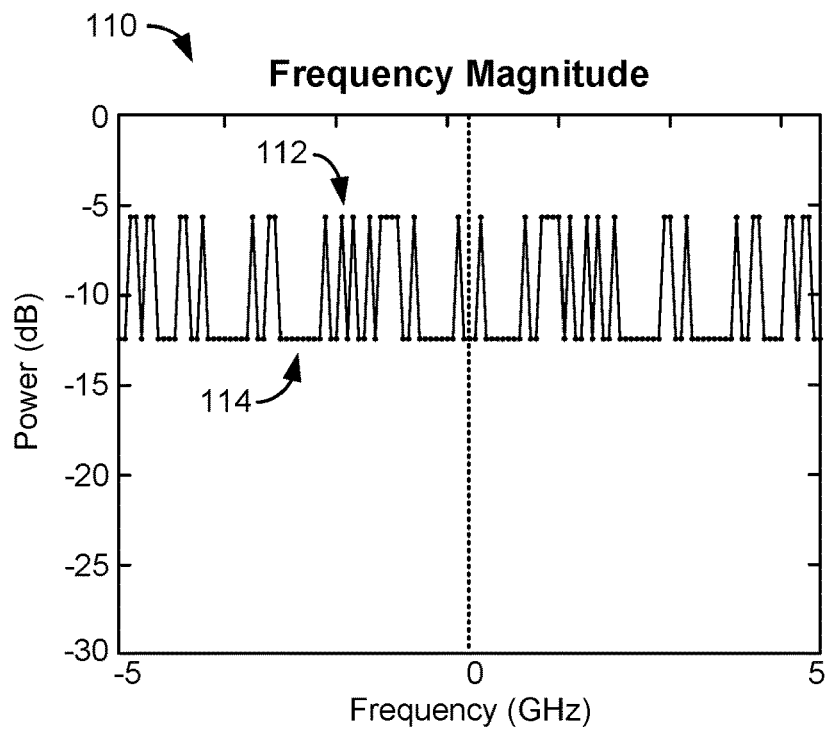
FIG. 1A illustrates an example of a spectrally synthesized preamble-codeword in the frequency domain in accordance with various aspects of the present disclosure.

Embodiments in accordance with the present disclosure relate generally to spread spectrum communication systems and in particular to coarse code acquisition in a direct sequence spread spectrum (DSSS) receiver demodulation block. The method may be of interest for wireless ultra-wide-band (UWB) and secure communication links requiring a large spreading factor and fast transmitter and receiver synchronization.

The spread spectrum technique was originally motivated by secured wireless radio communication links in the post-World War II era. The basic idea was to use a unique key to spread the modulated signal bandwidth in the frequency domain to bring the power spectral density (PSD) of the transmitted signal below the receiver noise floor and make it nearly impossible to differentiate the signal from the thermal noise. That is to say, undesired receivers/listeners who did not have access to the spreading key could not even notice if there was a transmitted wireless signal. On the other hand, a desired receiver could use the same key to despread the coded signal out of the noise and therefore make the original signal detectable. In this way, a secured transmission link with low probability of intercept (LPI) could be established between the parties who have the key.

Another advantage of spread spectrum systems is their resiliency to communication jamming techniques. While the despreading operation at the receiver elevates the power spectral density of the desired signal away from noise floor, at the same time it spreads any undesired signals, including jamming signals, and decreases their PSD until it approaches noise floor.

Different methods were originally proposed for spread spectrum modulation including chirp spread spectrum (CSS), direct sequence spread spectrum (DSSS), frequency hopping spread spectrum (FHSS), and time hopping spread spectrum (THSS). Among these, the DSSS systems, which are considered as one of the most successful spread spectrum systems due to inherent LPI and jamming resilience, are the subject of this disclosure. In DSSS, each data-modulated symbol is multiplied in the time domain by a data-codeword consisting of the multiple, fast 180-degree phase transitions within a single symbol duration. The shortest phase transition time in a given data-codeword is called a chip duration, and the ratio of the symbol duration to the chip duration defines the spreading factor or coding gain. In approximate terms, this is also the degree of spectral spreading, or equivalently, the degree to which original data PSD is attenuated.

A phase transition pattern, commonly referred to as the data-codeword, is generated in a pseudo-noise (PN) manner that has deterministic behavior with maximal spectral flatness. This class of data-codeword is called a pseudo-noise (PN) sequence or maximal length sequence and may be practically generated in a linear feedback shift registers (LFSR) device. The receiver uses the same data-codeword in order to multiply the received (i.e., spread) data stream and decode (i.e., despread) the transmitted data. However, the decoding is successful if and only if the received signal and the local de-spreading code generator are precisely synchronized in time. In the synchronized state, the local code generator applies an additional 180-degree phase rotation to the positions in a symbol that have already experienced the phase shift in the transmitter. As a result, the coded phase shift pattern is removed from the symbols in the receiver and actual bits of data are recovered.

Two phases of synchronization may be used to achieve successful decoding: coarse code acquisition, which aligns the incoming coded stream and the local code generator within a time scale that is approximately equal to the chip duration, and fine tracking, which brings the alignment between the received waveform and the data-codeword to within the fraction of the chip, while keeping the alignment fixed via a feedback scheme commonly referred as delayed locked loop (DLL).

Coarse code acquisition has been recognized as a limitation for implementation of high coding-gain direct sequence spread spectrum (DSSS) systems. Conventionally, coarse code acquisition is performed by either a serial search over multiple possible delays or by a fast digitizer capable of operation at the chip-rate on the receiver side, followed by a digital cross-correlator. The former suffers from slow synchronization convergence and the latter unnecessarily requires replicated hardware devoted to the coarse code alignment. Another impairment of conventional coarse code acquisition relates to the ability to synchronize in a low-latency manner.

While conventional synchronization can be accomplished with sufficient computational resources that are not limited by dissipation, even in this case, high coding gain may not be achieved. High-coding gain also dictates wide spectral spreading that directly defines the chip duration. When spectral spreading exceeds a rate compatible with conventional electronic processors, the synchronization scheme requires either hardware parallelization or redundancy implied with a subsampling backplane. In practical terms, when a spread spectrum receiver requires spreading in excess of GHz frequencies, the corresponding sub-nanosecond chip duration also requires synchronization electronics to operate at a comparable or faster rate.

While electronic architectures capable of operating at these rates may be devised, those architectures cannot be realized in a dissipation-limited manner, and not in a man-portable device. Even if the excessive dissipation involved in ultra-wideband DSSS is disregarded, a viable synchronization latency problem remains unsolved.

As an illustration, to search for unique synchronization setting over 10,000 chips corresponding to 40 dB gain receiver, a solution may be found after approximately 100,000,000 trials. This means that physical latency imposed on a DSSS link would be measured in terms of approximately 10,000 data bits—an unacceptable performance in any communication link. Further, if the transmitter and receiver are not stationary, as is the case in both commercial applications and defense applications where mobile platform can move at rate exceeding Mach number, then the synchronization latency requirement becomes much more stringent. In this case, the maximum synchronization latency is defined by the ratio of the relative transmitter/receiver velocity and the speed of light (i.e., the propagation of radio waves). For a slow or stationary receiver, this number is negligible. However, for an example MHz-rate bit stream spread over 10 GHz (i.e., a 100 picosecond chip duration), operating on a subsonic (i.e., 300 m/s speed) platform, then its synchronization must be performed in approximately less than 10 microseconds, or in less than five native bits.

Known synchronization technique do not approach this requirement, which is one of the primary reasons why ultra-wideband DSSS channels have not been adopted to date, in spite of attractive security features that they inherently offer. As the increase in physical bandwidth is steadily driven in the commercial sector, a similar consideration is applicable there, and particularly so for transportation platforms where the user requires both security and high data rate at minimal latency.

The present embodiments advantageously overcome deficiencies of conventional communication systems by enabling low latency and low computation cost synchronization apparatus for spread spectrum communication systems.

Some embodiments of the present invention relate to methods for receiver synchronization of direct sequence spread spectrum (DSSS) communication systems having a large spreading factor (e.g., coding gain greater than 40 dB). The synchronization method may involve designing a pre-amble-codeword designed to not only preserve the security of the communication link, but also to reduce the complexity of the DSSS receiver at the code acquisition stage. The technique for DSSS receiver synchronization is based, in some embodiments, on a sparse Fourier analysis that calculates the sparse Fourier coefficients of the designed preamble to achieve cross-correlation in frequency domain. The complexity of the receiver is further reduced by circumventing the inverse Fourier transform and estimating the delay information through an adaptive iterative filtering algorithm in the sparse Fourier domain in some embodiments.

Aspects of the various embodiments provide a method for coarse code acquisition that allows for fast and low complexity synchronization of DSSS signals with large coding gain (e.g., more than 40 dB) receivers. The method may include the following components: a spectrally synthesized preamble, a Sparse Discrete Fourier Transform (SDFT) module, and specialized iterative filtering.

In some embodiments, the synthesized preamble may be placed at the beginning of a transmitted coded data frame that has been coded using the synthesized preamble. At the receiver, the electrical SDFT is applied to the incoming data stream. The SDFT precisely targets the spectral positions in the preamble spectral range that are synthesized to have substantial power. The electrical SDFT is accomplished by techniques such as, but not limited to, non-uniform time domain sampling or a poly-phase filter banks architecture. In other embodiments, the SDFT is performed in a hybrid optical/electrical domain using two sets of optical frequency combs having different frequency spacing. The calculated SDFT coefficients of the incoming data stream are multiplied by the complex conjugate SDFT coefficients of the preamble-codeword to produce the frequency domain representation of the cross-correlation function. In still other embodiments, a Sparse inverse Discrete Fourier Transform (SiDFT) may be performed to retrieve the time domain cross-correlation function which contains delay and synchronization information. In yet other embodiments, the delay information may be extracted directly from the frequency domain cross-correlation function using adaptive and iterative filtering.

The method described herein is unique when compared with other known processes and solutions in that it: (1) can synchronize a spread spectrum communication link substantially faster than conventional techniques; (2) can achieve a synchronization state on high-acceleration and platforms moving at substantial speed (3) can achieve the synchronization with a low signal to noise ratio (SNR) regime; (4) can achieve the synchronization in contested electromagnetic environments replete with artificial jamming and/or heavy clutter backgrounds; (5) can operate in the presence of a multi-path interference (MPI) map for the physical configuration of the specific link; and (6) allows for significant reduction in complexity, receiver power consumption, and computational expenses.

More specifically, the various embodiments may: (1) exploit a specifically synthesized preamble-codeword; (2) allow for sparse calculation and operation for time and frequency domain conversions; and (3) enable the use of adaptive filtering for delay estimation. Among other things, embodiments may provide a synchronization technique for spread spectrum system with large spreading factor (i.e., more than 40 dB) that does not suffer from any of the problems or deficiencies associated with prior solutions. The various embodiments may simplify construction of synchronization scheme and reduce power consumption and complexity associated with transmitter/receiver synchronization.

In accordance with aspects of the present disclosure, embodiments may include two major sections: (1) a spectrally-sparse preamble design rule to synthesize the preamble-codeword; and (2) a receiver architecture design which uses the specific preamble-codeword to synchronize and accurately decode the incoming data stream. Herein, the term "preamble-codeword" will be used to denote the synthesized pattern which has spectrally sparse frequencies and is placed at the header of the data packet, and term "data-codeword" will be used for pseudo-noise binary phase transition pattern used to encode the payload of the packet.

Figure 1B:
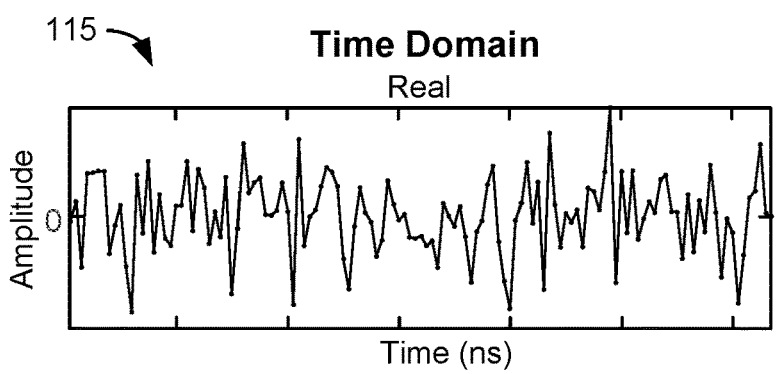
FIGS. 1B and 1C illustrate an example of real and imaginary parts, respectively, of an example single quadrature preamble in the time domain generated from the spectrally synthesized preamble-codeword of FIG. 1A.
Figure 1C:
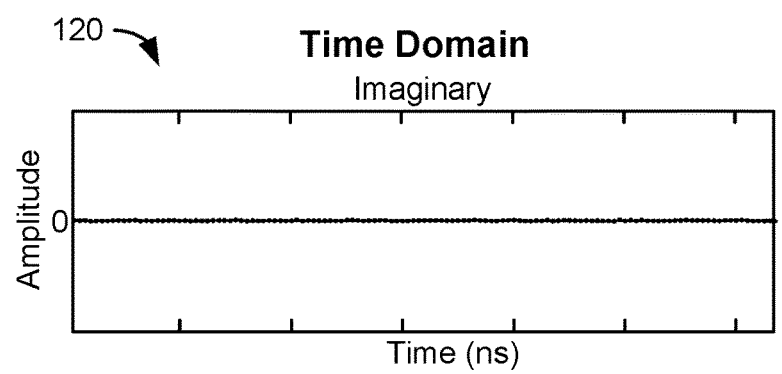

FIG. 1A illustrates an example of a spectrally synthesized preamble-codeword 110 in the frequency domain in accordance with various aspects of the present disclosure. FIGS. 1B and 1C illustrate an example of a real part 115 and an imaginary part 120, respectively, of an example single quadrature preamble in the time domain generated from the spectrally synthesized preamble-codeword of FIG. 1A. As illustrated in FIG. 1A, it should be noted that the spectrally synthesized preamble-codeword 110 is symmetric about zero frequency, therefore the time domain signal (i.e., the preamble) will have no imaginary component.

The preamble-codeword design may begin with spectral shaping by selecting non-uniformly distributed spectral locations 112 within the communication bandwidth. The number of frequencies selected may be determined based on the sparse density processing capability of the DSSS receiver. In accordance with various aspects of the present disclosure, the frequencies may be randomly selected or specific frequencies may be selected. Referring to FIG. 1A, preamble-codeword spectral shaping, i.e., the selection of the frequencies at which spectral peaks occur, may correlate with a plurality of frequencies (i.e., spectral locations 112) for which coefficients may be determined when the SDFT is performed at the receiver. The SDFT calculates the Fourier components equal to the number of frequencies in the preamble-codeword.

These points on the spectrum (i.e., spectral peaks) may have higher spectral power compared to the background power spectral density (PSD) 114 of the preamble-codeword. The contrast between the peak power spectral points and background PSD may be another parameter for preamble spectral/time visibility. In FIG. 1A, the contrast is approximately 7 dB, but this is not required by the present embodiments and any other arbitrary contrast values can be achieved.

In the embodiment illustrated in FIG. 1A, the peak power spectral points 112 for the synthesized the preamble-codeword 110 may be chosen symmetrically around a center frequency (i.e., zero frequency for baseband preamble design). In this case, the time domain preamble remains in real quadrature as illustrated in FIGS. 1B and 1C (i.e., no imaginary component as shown in FIG. 1C). In some embodiments, peak power spectral points for the preamble-codeword in the frequency domain may be distributed randomly within negative and positive frequencies, which makes the preamble complex (i.e., contains both real and imaginary quadrature) in the time domain.

Figure 2A:
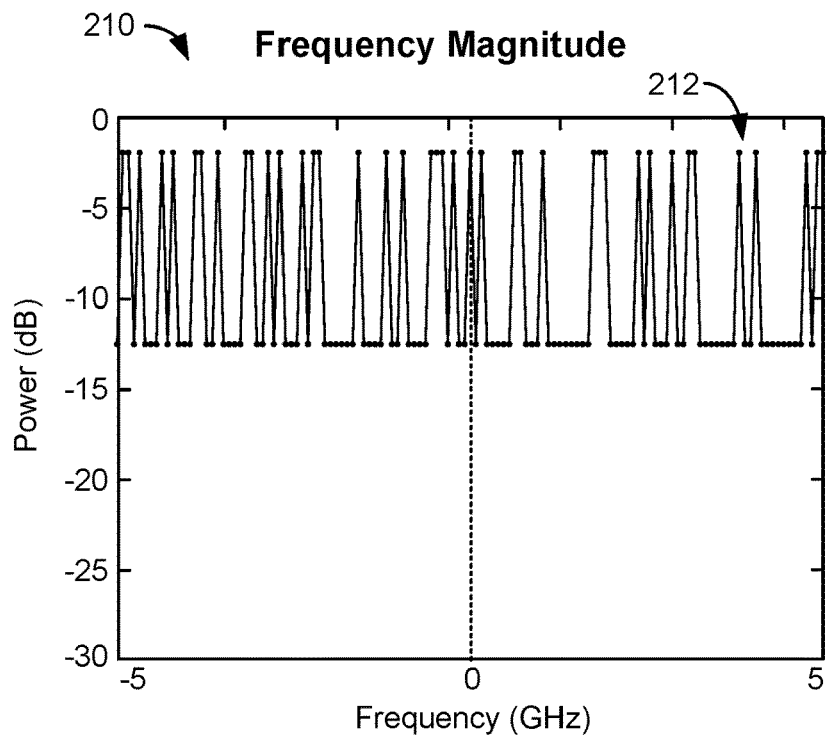
FIG. 2A illustrates an example of a spectrally synthesized preamble-codeword having peak power spectral points randomly distributed within negative and positive frequencies in the frequency domain.
Figure 2B:
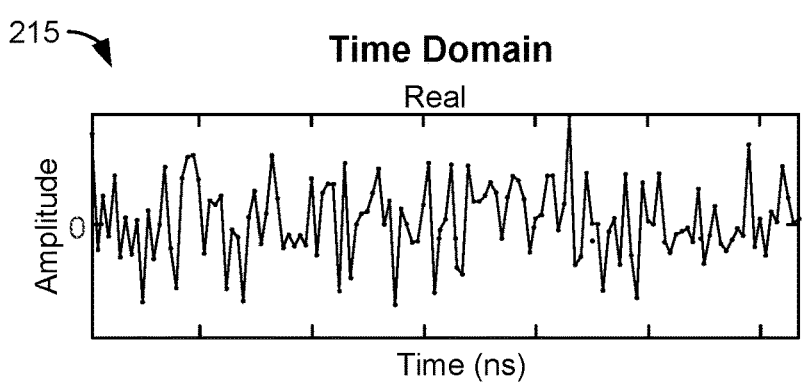
FIGS. 2B and 2C illustrate examples of a real part and an imaginary part, respectively, of an example double quadrature preamble in the time domain generated from the spectrally synthesized preamble-codeword of FIG. 2A in accordance with various aspects of the present disclosure.
Figure 2C:
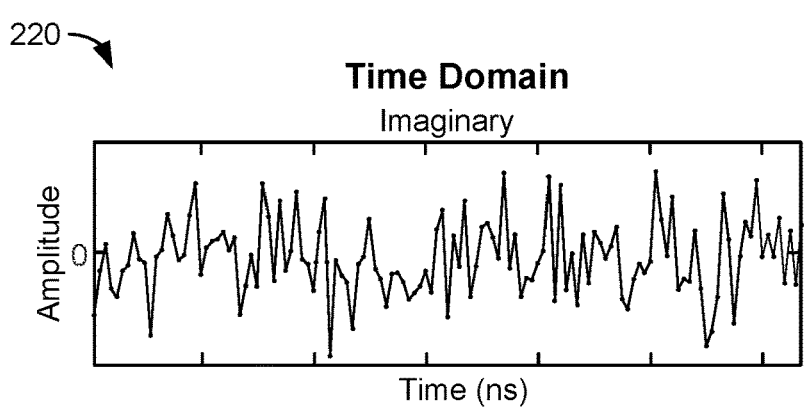

FIG. 2A illustrates an example of a spectrally synthesized preamble-codeword 210 having peak power spectral points 212 randomly distributed within negative and positive frequencies in the frequency domain in accordance with various aspects of the present disclosure. FIGS. 2B and 2C illustrate examples of a real part 215 and an imaginary part 220, respectively, of an example double quadrature preamble in the time domain generated from the spectrally synthesized codeword of FIG. 2A in accordance with various aspects of the present disclosure.

As illustrated in FIGS. 2A-2C, when the peak power spectral points 212 are distributed randomly within negative and positive frequencies in the frequency domain, the preamble contains real 215 and imaginary 220 components in the time domain. In this implementation, an in-phase/quadrature (I/Q) modulator may be required for up-converting the preamble into the desired transmission band using techniques known to those of skill in the art to upconvert two quadrature signals using sine and cosine for real and imaginary parts and adding them, compared to using only cosine for single quadrature upconversion.

The preamble-codeword may be agreed upon between the transmitter and receiver in advance. An SDFT module at the receiver specifically considers the power spectral peaks of the preamble, which contain nearly all the preamble energy, as the sparse points for the Fourier transform calculation. Therefore, the need for full rate Fourier analysis at the receiver becomes unnecessary and the complexity of the receiver may be reduced by several orders of magnitude by computation of the sparse coefficients due to the fact that calculating the Fourier coefficients can be limited to only a subset of all coefficients that is defined by the sparse spectral peaks locations. For example, if the subset includes 10 spectral peak locations out of 100 total spectral samples, the SDFT calculates only a 10 point DFT compared to a 100 point DFT that would be calculated for a full Fourier analysis of the 100 spectral samples.

After the preamble-codeword spectral shaping has been performed, a time domain signal (i.e., the preamble) corresponding to the synthesized preamble-codeword may be generated, for example using a digital-to-analog converter (DAC) or by another method. For example, the time domain signal 115, 120 in FIGS. 1B and 1C may be generated based on the synthesized preamble-codeword 110 in FIG. 1A. Since the synthesized preamble-codeword 110 is symmetric about zero frequency, the time domain preamble will have no imaginary component. Similarly, the time domain signal 215, 220 in FIGS. 2B and 2C may be generated based on the synthesized preamble-codeword 210 in FIG. 2A. In FIG. 2A the synthesized preamble-codeword 210 is not symmetric about zero frequency; thus, the time domain preamble contains real components 215 and imaginary 220 components.

The preamble may be generated by inputting the synthesized preamble-codeword into a digital-to-analog converter (DAC) and performing an inverse Fourier transform or iDFT. The DAC may have a minimum required signal-to-noise and distortion ratio (SINAD) greater than the spectral contrast of the synthesized preamble-codeword (e.g., the synthesized preamble-codeword 110 or the synthesized preamble-codeword 210).

Figure 3:
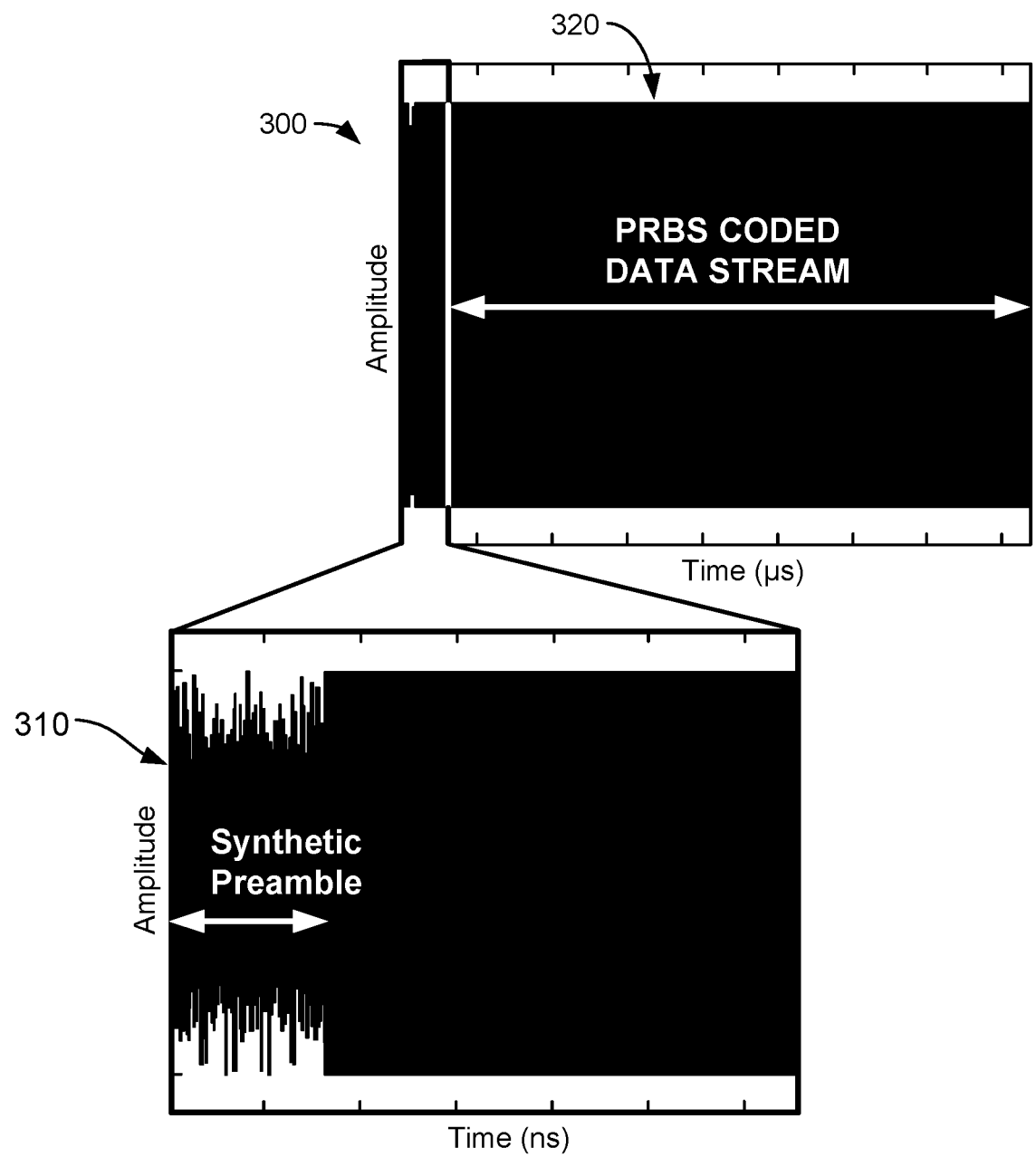
FIG. 3 illustrates an example of a transmitted DSSS frame formed by prepending a time domain preamble to a pseudorandom binary sequence (PRBS) coded payload in accordance with various aspects of the present disclosure.

FIG. 3 illustrates an example of a transmitted DSSS frame 300 formed by prepending a time domain preamble 310 generated from a synthesized preamble-codeword to a pseudo-random binary sequence (PRBS) coded data stream (i.e., payload) 320 in accordance with various aspects of the present disclosure. While the PRBS coded data stream is represented in FIG. 3 as a signal having a constant amplitude, this is only for ease of representation to differentiate the time domain preamble from the PRBS coded data stream. One or ordinary skill in the art will appreciate that the PRBS coded data stream is a time varying signal. The preamble 310 may be included in each transmitted DSSS frame 300. Each data-modulated symbol in the payload may be multiplied in the time domain by the multiple, fast 180-degree phase transitions within a single symbol duration defined by the data-codeword. The coded data payload 320 of the frame 300 may use pseudo-random binary sequences (PRBS) for spreading that are suited for a conventional fine tracking algorithm. The fine tracking algorithm may use known delay lock loop (DLL) techniques.

In accordance with various aspects of the present disclosure, a new preamble-codeword be may periodically or randomly synthesized/hopped to minimize the possibility of unintended detection/decoding of transmitted information. For example, a different preamble, with different spectral peak locations, may be synthesized after a it has been used for a predetermined period of time. Alternatively, a different preamble may be synthesized after a codeword has been used for a predetermined number of transmitted frames. As a further alternative, a different preamble may be synthesized after a it has been used for a random period of time or a random number of transmitted frames. One of ordinary skill in the art will appreciate that other schemes for determining to synthesize a new code word may be used without departing from the scope of the present disclosure.

Figure 4A:
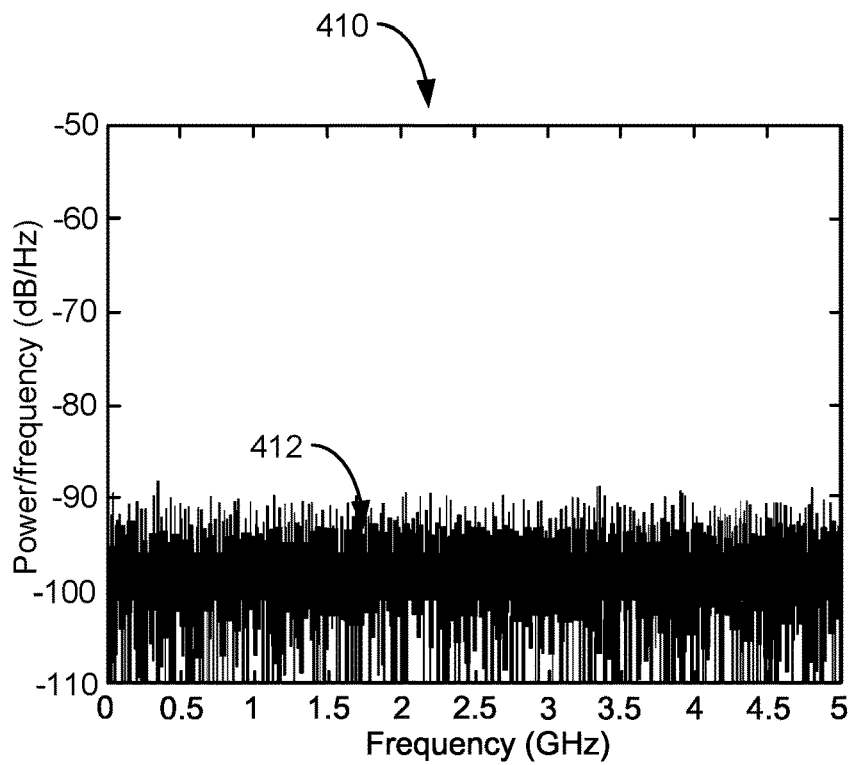
FIGS. 4A-4D illustrate examples of power spectral densities of a transmitted frame for different preamble to payload ratios in accordance with various aspects of the present disclosure.
Figure 4B:
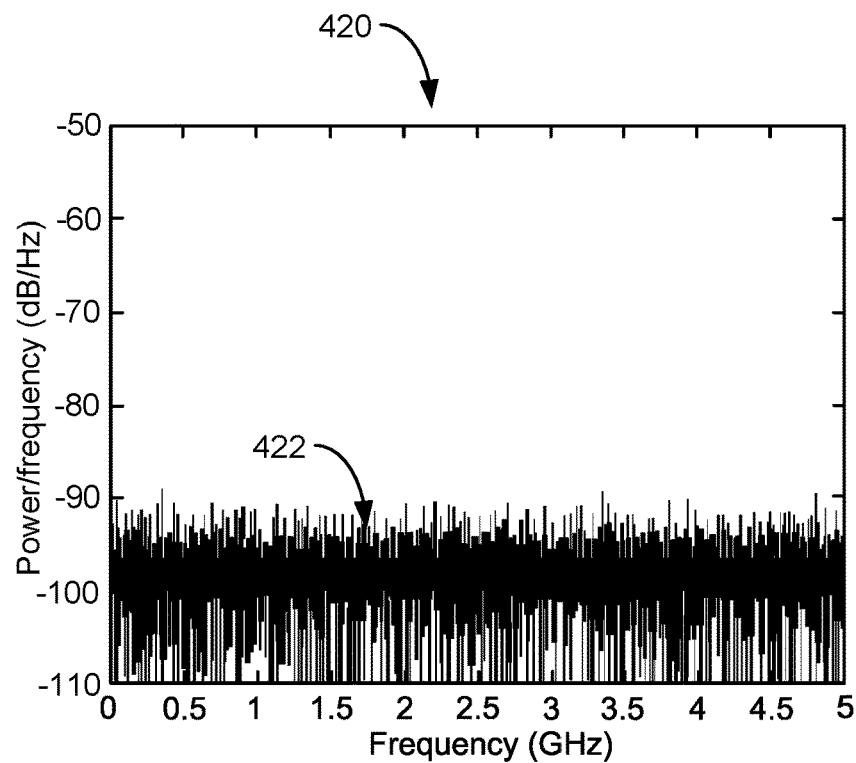
Figure 4C:
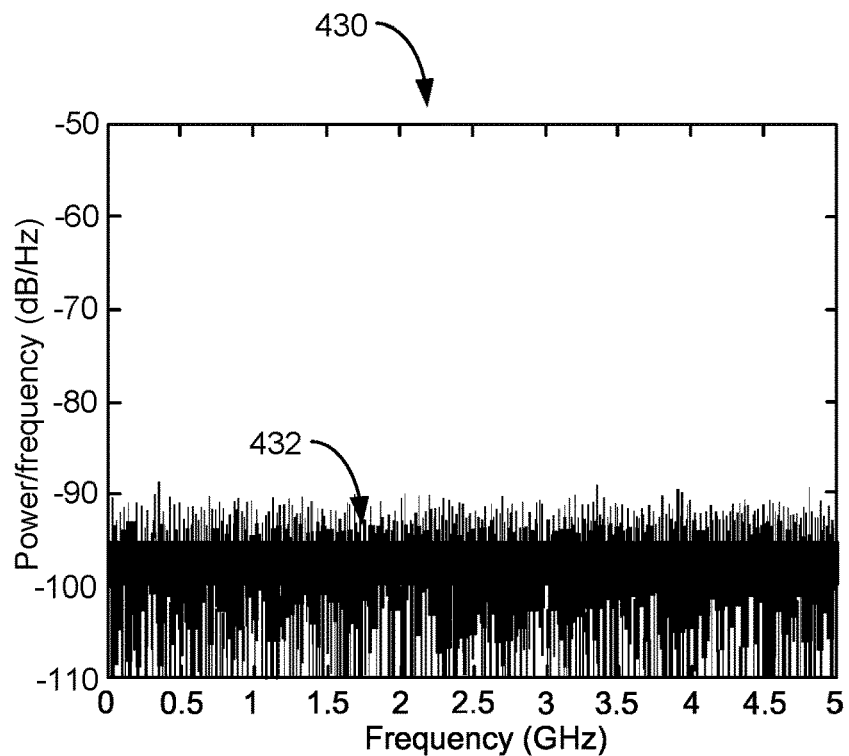
Figure 4D:
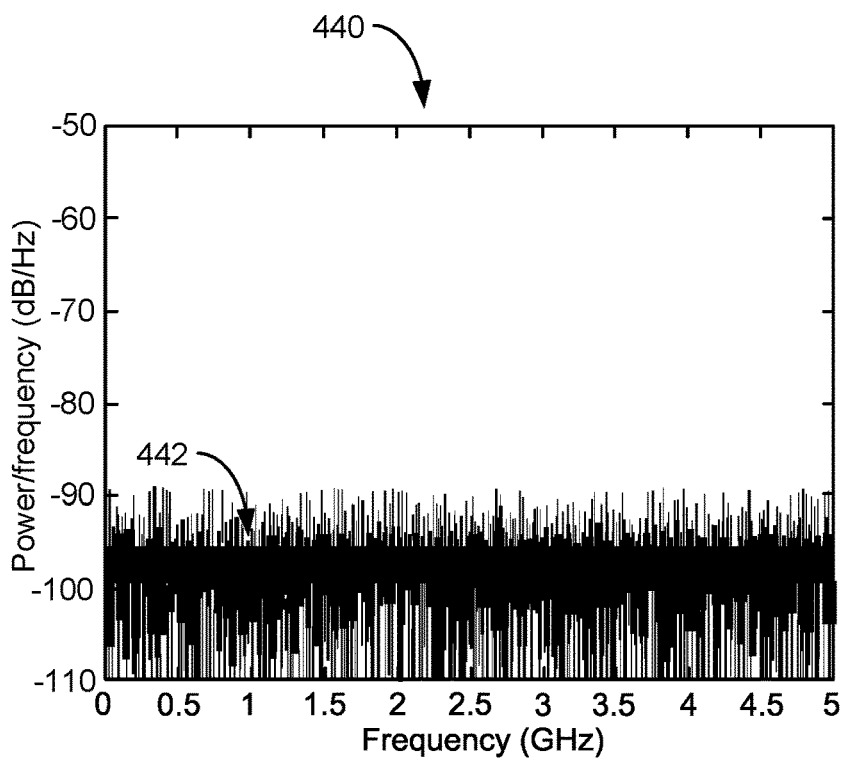

FIGS. 4A-4D illustrate examples of power spectral densities of transmitted DSSS frames for different preamble to payload ratios in accordance with various aspects of the present disclosure. FIG. 4A illustrates a power spectral density estimate for a DSSS frame having no preamble 410. The power spectral density estimate FIG. 4A shows a noise floor 412 of approximately −90 dB/Hz. FIG. 4B illustrates a power spectral density estimate for a DSSS frame having a preamble occupying 1% of the frame 420. As can be seen in FIG. 4B, with the preamble occupying 1% of the frame the noise floor 422 remains approximately −90 dB/Hz. Similarly, FIGS. 4C and 4D show that the noise floors 432, 442 remains approximately −90 dB/Hz for DSSS frames having preambles occupying 5% of the frame 430, and 10% of the frame 440, respectively. The ratio of the preamble duration to payload in each frame may be assigned to properly hide the spectral peaks of the preamble portion in the white noise spectrum of the payload while the code acquisition performance remains intact. Thus, the DSSS frame containing the transmitted information is also indistinguishable from noise.

Figure 5:
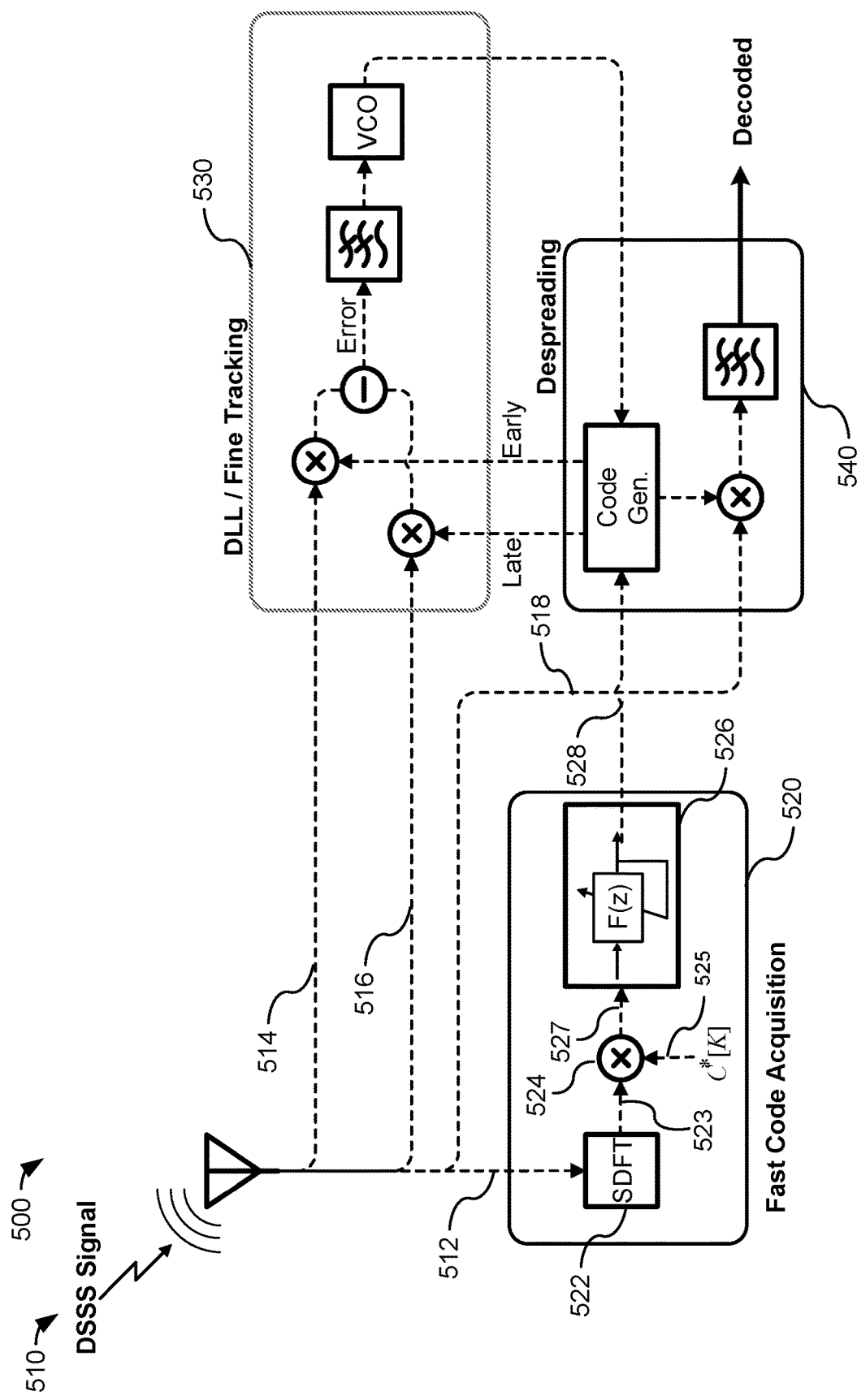
FIG. 5 is a block diagram illustrating a DSSS receiver in accordance with various aspects of the present disclosure.

FIG. 5 is a block diagram illustrating a DSSS receiver 500 in accordance with various aspects of the present disclosure. Referring to FIG. 5, the DSSS receiver 500 may include a fast code acquisition module 520, a delay locked loop (DLL)/fine tracking module 530, and a despreading/decoding module 540.

At the DSSS receiver 500, the incoming DSSS modulated signal 510 may split into four paths: the first path 512 may be input to the fast code acquisition module 520; the second path 514 and third path 516 may be input to the DLL/fine tracking module 530; and the fourth path 518 may be input to the despreading/decoding module 540. Successful operation of DLL/fine tracking module 530 and the despreading module 540 may be based on the performance of the fast code acquisition module 520. In some embodiments, the code acquisition is accomplished rapidly by the fast code acquisition module 520 to reduce or minimize loss of transmitted data blocks and may be accurate to within less than or equal to two chip durations for operation of the fine tracking algorithms.

The fast code acquisition module 520 may include a Sparse Discrete Fourier Transform (SDFT) module 522, a multiplier 524, and an iterative filter module 526. The code acquisition may begin with the SDFT module 522. In some embodiments, the electrical SDFT is accomplished by techniques such as, but not limited to, non-uniform time domain sampling or a poly-phase filter banks architecture. In some embodiments, the SDFT may be implemented digitally, for example with an application specific integrated circuit (ASIC) or other programmable logic device configured to perform the SDFT. The SDFT module 522 may enable both calculation complexity and input/output (I/O) throughput to be scaled by the sparsity ratio of the SDFT (i.e., the ratio of the number of points used for the SDFT analysis to the number of points required for a full DFT analysis).

The SDFT module 522 calculates the Fourier coefficients of the synthesized preamble-codeword from the preamble received with the DSSS frames based on the sparsely allocated spectral peaks determined by the synthesized preamble-codeword in the frequency domain. When the receiver receives the signal, it applies the SDFT to the incoming stream. The preamble-codeword is shared between receiver and transmitter. The transmitter generates the preamble-codeword and puts it in front of (i.e., prepends it to) the data frame. Thus, the receiver is also aware of the preamble-codeword (i.e., reference codeword) having agreed upon it in advance with the transmitter. The receiver multiplies the incoming SDFT by the conjugate of the reference codeword. The output is sent to the iterative filter and a relative delay between the received signal and reference codeword is calculated by the iterative filter. The Discrete Fourier Transform (DFT) of the preamble-codeword c[n] may be calculated as:

$$C[K] = \sum_{n=1}^{N} c[n] e^{-\frac{j2\pi n K}{N}}$$

where K∈{full spectrum indices}.

The Sparse Discrete Fourier Transform of the preamble-codeword c[n] (i.e., the output 523 of the SDFT module 522) may be calculated as:

$$C[K] = \sum_{n=1}^{N} c[n] e^{-\frac{j2\pi n K}{N}}$$

where K∈{sparse indices}.

Knowing the synthesized preamble-codeword (i.e., having received the preamble with the DSSS frame), and adjusting the K∈{sparse indices} based on the sparse set of spectral points agreed upon in advance between the transmitter and the receiver, the SDFT module 522 in the DSSS receiver 500 may configure itself to the calculate the Fourier coefficients of the coded data stream at only the peak power spectral points (e.g., the peak power spectral points 122 in FIG. 1) determined by the synthesized preamble-codeword. Thus, Fourier analysis of the DSSS signal may be simplified by performing the SDFT to generate only the Fourier coefficients for the frequencies corresponding to the spectral locations determined by the synthesized preamble-codeword.

Once the SDFT coefficients of the synthesized codeword are obtained, the complex conjugate SDFT coefficients of the preamble-codeword may be generated at the DSSS receiver based on the reference codeword.

The SDFT module 522 may calculate the SDFT coefficients 523 of the received stream (e.g., the preamble and the PRBS coded data stream 320) and the SDFT coefficients 523 of the incoming stream may be multiplied at the multiplier 524 by the complex conjugate SDFT coefficients C*[K] 525 of the synthesized preamble-codeword to generate the Fourier transform of the cross-correlation 527 between the received incoming stream and the reference preamble-codeword generated at the receiver. The output of the multiplier (i.e., the cross-correlation) may be sent to the iterative filter to calculate the relative delay between the received signal and reference codeword.

The cross-correlation (i.e., the output of multiplier) in the frequency domain contains a linear phase rotation across the coefficients. Equivalently, the cross-correlation function in the time domain carries a temporal peak that indicates the relative delay between the received DSSS signal and the reference preamble-codeword.

In some embodiments, the cross-correlation signal output of the multiplier 524 may be input to an iterative filter block 526. The linear phase rotation across the SDFT coefficient product terms may be extracted directly without further domain conversion by the iterative filter block 526 using an iterative filtering algorithm. The iterative filter block 526 may apply the iterative filtering algorithm to the cross-correlation signal and a delay estimation 528 may be generated. In some embodiments, a Sparse inverse Discrete Fourier Transform (SiDFT) algorithm may be used to estimate the delay. The SiDFT operation on the cross-correlation product coefficients may convert the linear phase rotation into a spike that may appear as a sharp spike. The location of the spike with respect to the sequence length may determines the amount of delay.

However, implementation of an iterative filtering algorithm may further simplify the delay estimation when compared to the SiDFT algorithm. Thus, the fast code acquisition module 520 may align the incoming coded stream and the local code generator (i.e., the complex conjugate preamble-codeword generated at the DSSS receiver) within a time scale that is approximately equal to the chip duration.

The delay estimation 528 output of the iterative filtering module 562 may be input to the despreading module 540 for demodulating/decoding of the incoming DSSS signal. The despreading module 540 may generate a coded signal advanced by one-half of a chip duration (i.e., an "early" coded signal) and a coded signal delayed by one-half of a chip duration (i.e., a "late" coded signal). The early and late coded signals may be input to the DLL/fine tracking module 530. The output of the DLL/fine tracking module 530 may be input to the despreading module 540 to synchronize decoding of the DSSS signal. The DLL/fine tracking module 530 may output the clock signal that is corrected by the calculated error signal. The clock signal may seed the code generator module in despreading block 540 to compensate the residual fine delay (i.e., within one chip duration) and keep the incoming stream and local data-codeword generator in a synchronized state.

Figure 6:
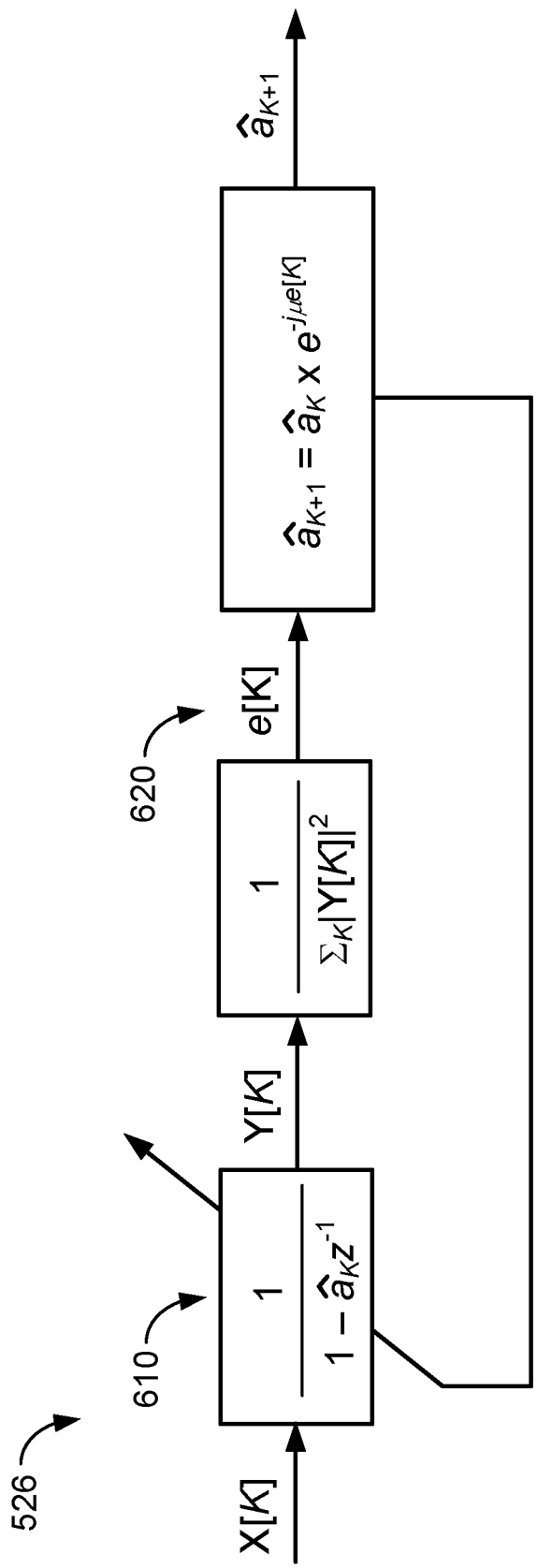
FIG. 6 is a block diagram of an iterative filtering algorithm used for delay estimation in accordance with various aspects of the present disclosure.

FIG. 6 is a block diagram of an iterative filtering algorithm 600 implemented in an iterative filtering module 526 for estimating delay in accordance with various aspects of the present disclosure. Referring to FIG. 6, the iterative filtering algorithm 600 may include an infinite impulse response (IIR) filter 610 in a feedforward direction with a single pole at $e^{j\pi\hat{\alpha}}$ where $\hat{\alpha}$ is the estimated phase slope (or equivalently the time delay) of the input complex coefficients. Any value of $\hat{\alpha}$ maps into a delay value between the incoming preamble-codeword and the reference preamble-codeword generated at the receiver side. A first iteration may begin with an initial guess for $\hat{\alpha}_0$.

An error signal 620 may be generated based on filtering of the input complex coefficients with the IIR filter having a single pole at $e^{j\pi\hat{\alpha}_0}$. The new estimation for the pole position, $\hat{\alpha}_1$, may be derived from the error signal. This iteration may continue until the difference between the two consecutive estimated poles, $\hat{\alpha}_{k+1}$ and $\hat{\alpha}_k$, becomes smaller than an equivalent of single chip delay. The output of the iterative filtering module 562 may be input to the despreading module 540 as a coarse delay estimation. One of ordinary skill in the art will appreciate that other iterative filtering algorithms may be implemented without departing from the scope of the present disclosure.

While the described embodiment employs an iterative filtering algorithm, embodiments of the present disclosure are not limited to this implementation. In some embodiments, the product of the SDFT coefficients and complex conjugate of the Fourier coefficients of the preamble may be passed to a Sparse inverse DFT (SiDFT) engine to extract the temporal peak and relative delay.

Figure 7:
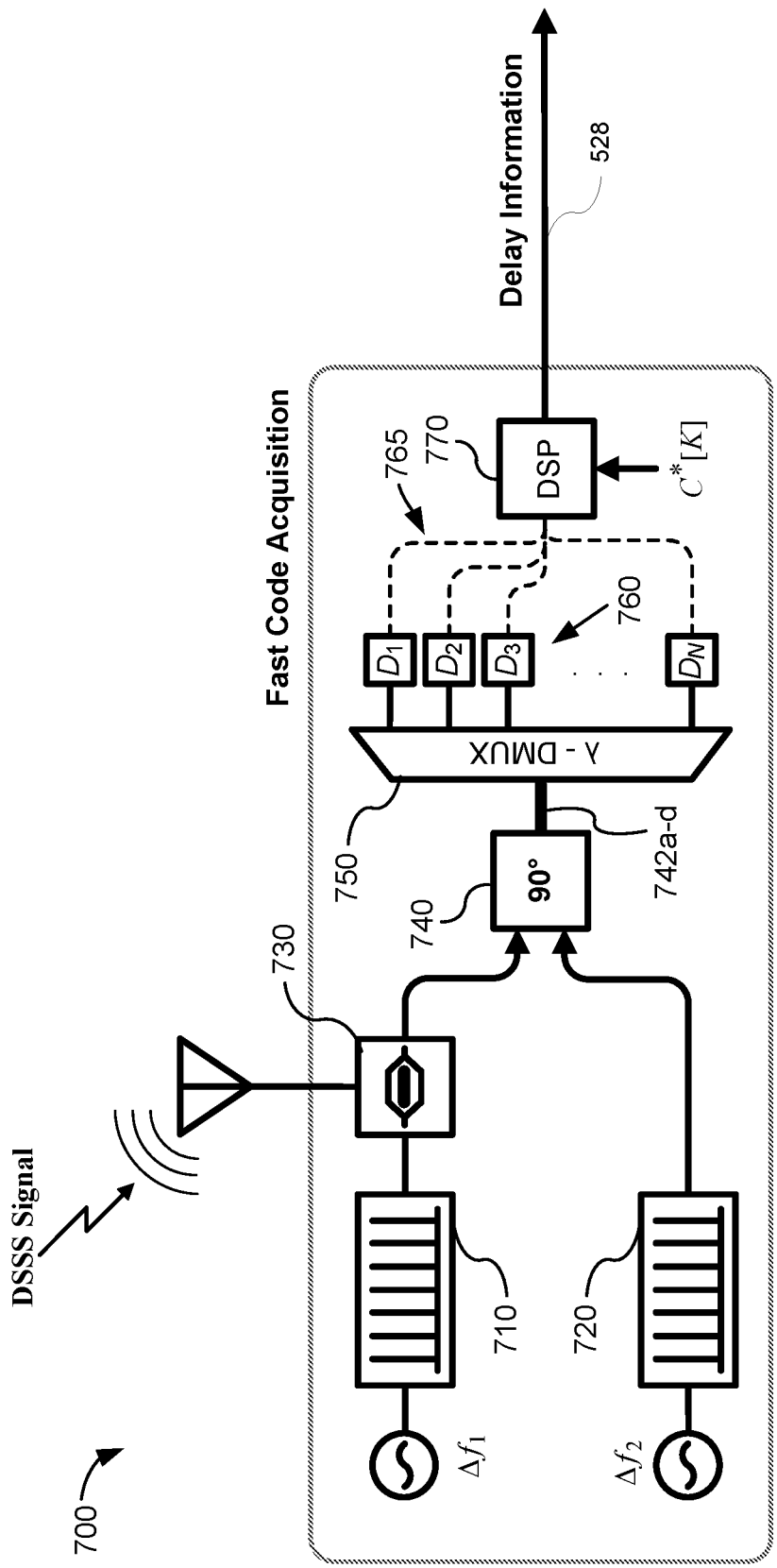
FIG. 7 is a block diagram of a hybrid optical/electrical implementation for a code acquisition block in accordance with various aspects of the present disclosure.

In some embodiments, the SDFT may be performed in a hybrid computation free optical/electrical architecture. FIG. 7 is a block diagram of a hybrid optical/electrical implementation for a code acquisition module 700 in accordance with various aspects of the present disclosure. The hybrid optical/electrical code acquisition module 700 may include a first optical frequency comb 710, a second optical frequency comb 720, an optical modulator 730, a hybrid optical module 740, an optical wavelength demultiplexer 750, a plurality of detectors 760, and a filter 770.

In implementations of the optical/electrical hybrid architecture, a first set of frequency combs 710 having a first frequency pitch and a second set of frequency combs 720 having a second frequency pitch may be used to extract SDFT coefficients. The first optical frequency pitch and the second optical frequency pitch may be different frequency pitches.

The optical modulator 730 may modulate the frequencies generated by the first optical frequency comb 710 using the received DSSS signal to generate spectral copies of the DSSS signal on the tones (i.e., different optical wavelengths) of the first optical frequency comb 710. The second optical frequency comb 720 may act as a local oscillator. The modulated optical signal from the first optical frequency comb 710 and the optical signal (i.e., local oscillator signal) from the second optical frequency comb 720 may be combined by the 90° hybrid optical module 740. The 90° hybrid optical module 740 may act as a coherent receiver and output four signals: a modulated signal plus local oscillator signal 742a, a modulated signal minus local oscillator signal 742b, a modulated signal plus conjugate of local oscillator signal 742b, and a modulated signal minus conjugate of local oscillator signal 742d. The output signals of the hybrid optical module 740 may be input to the optical wavelength demultiplexer 750.

The optical wavelength demultiplexer 750 may include a plurality of demultiplexer modules. In some implementations, four demultiplexer modules may be used. Each demultiplexer module may be configured to demultiplex one output 742a-d of the hybrid optical module 740. The demultiplexed signals may be detected by the plurality of detectors 760. The plurality of detectors $D_1$-$D_N$ 760 may be coherent detectors. In some embodiments, each coherent detector may include two balanced detectors, with each balanced detector having two PIN diodes (i.e., a total of four PIN diodes for each coherent detector). Each of the plurality of detectors $D_1$-$D_N$ 760 receives a signal from each of the plurality of demultiplexer modules. For example, for implementations using four demultiplexer modules, each detector $D_1$-$D_N$ receives a signal from each demultiplexer module, i.e., each detector $D_1$-$D_N$ receives four signals. The plurality of detectors $D_1$-$D_N$ 760 may correlate with the plurality of frequencies (i.e., spectral locations 122) for which the SDFT coefficients specified by the synthesized codeword may be determined. The spectral peak locations are known to the receiver 500. The receiver 500 may activate the detectors matching the spectral locations. Each of the active detectors $D_1$-$D_N$ 760 may coherently detect SDFT coefficients. Each of the detectors $D_1$-$D_N$ may output in-phase and quadrature (I & Q) signals representing the detected SDFT coefficients 765. Thus, the optical/electrical hybrid architecture may stream the SDFT coefficients in a computation free manner.

The SDFT coefficients 765 may be input to a digital signal processor (DSP) 770 or other programmable device configured to perform the multiplication by the complex conjugate SDFT coefficients of the reference preamble-codeword. The complex conjugate coefficients of the preamble-codeword may be generated by the DSP 770.

The DSP 770 or other programmable device may further implement an iterative filtering algorithm or a SiDFT algorithm to generate a delay estimation for output to the despreading module 540. For example, the DSP 770 may implement the iterative filtering algorithm 600 as described with respect to FIG. 6. The output of the DSP 770 is the output 528 of the fast code acquisition module 520 that may be sent to the despreading module 540. The optical front end 700 is one realization of the SDFT module 522. In this implementation, the DSP 770 may perform the operations described with respect to the fast code acquisition module 520.

Figure 8:
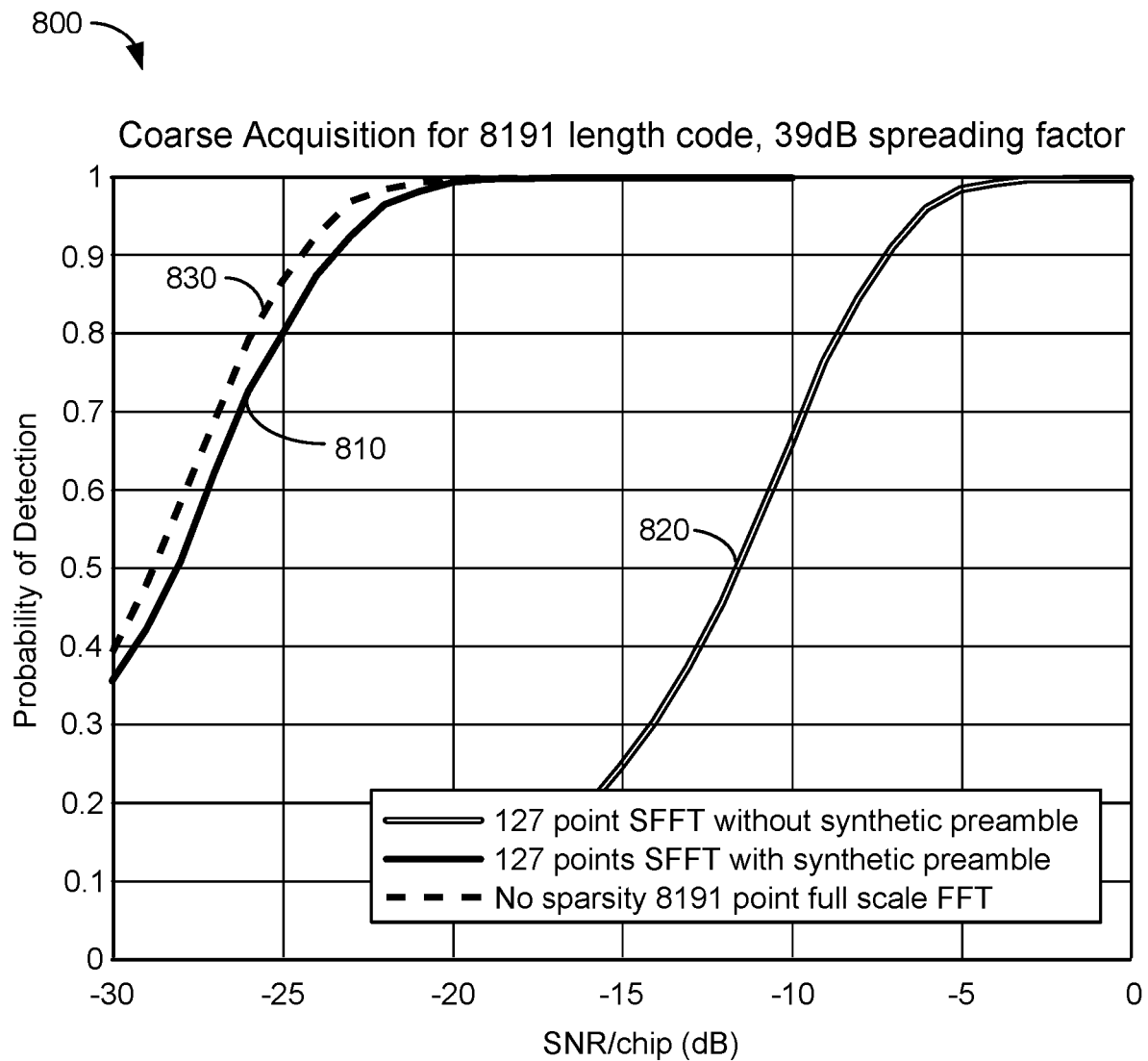
FIG. 8 is a plot illustrating performance of the presently disclosed code acquisition technique compared to conventional techniques.

FIG. 8 is a plot 800 illustrating performance of the presently disclosed code acquisition technique compared to conventional techniques. Referring to FIG. 8, the calculated performance curve for the presently disclosed code acquisition technique 810 with a preamble generated from a synthesized preamble-codeword is compared to a conventional technique 820 without the preamble and a conventional full-scale receiver 830. The performance curve for the conventional technique 830 was calculated based on a full scale DFT of 8191 points. The curve for the conventional SDFT technique without preamble 820 and the curve for the SDFT with preamble 810 of the present disclosure were both calculated using a SDFT having 127 points. As can be seen in FIG. 8, the curves show the efficiency of the presently disclosed code acquisition technique 810 with nearly the same performance when compared to the conventional full-scale receiver 830.

Figure 9:
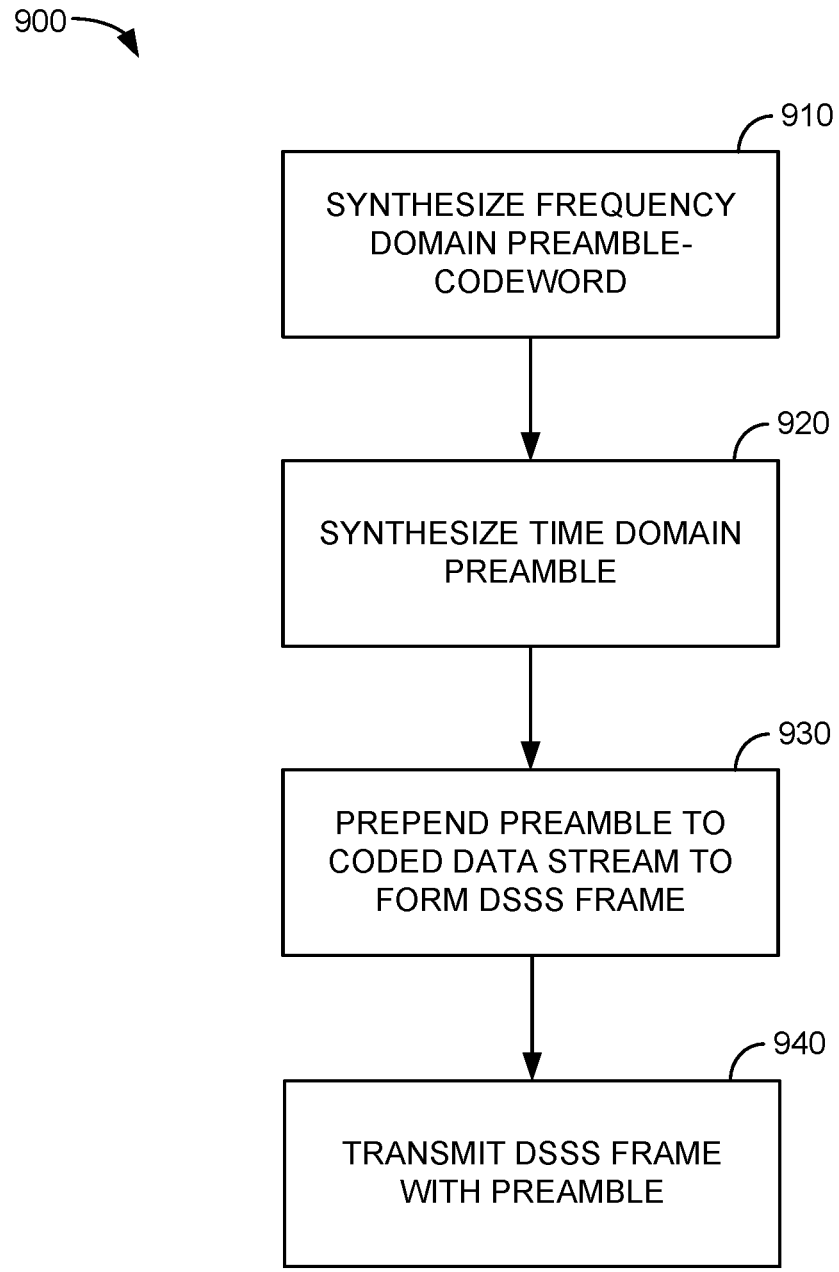
FIG. 9 is a flowchart of a method for generating a synthesized preamble-codeword for a DSSS signal in accordance with various aspects of the present disclosure.

FIG. 9 is a flowchart illustrating a method 900 for generating a synthesized preamble-codeword for a DSSS signal in accordance with various aspects of the present disclosure. Referring to FIG. 9, at block 910 a preamble-codeword may be synthesized in the frequency domain. For example, a plurality of spectral locations within the frequency band of the DSSS communication system may be selected, i.e., the preamble-codeword may be spectrally shaped. The number of frequencies selected may be determined based on the sparse density processing capability of the DSSS receiver. The frequencies may be randomly selected or specific frequencies may be selected. These points on the spectrum (i.e., spectral peaks) may have higher spectral power compared to the background PSD of the codeword.

The selected frequencies for spectrally shaping the codeword may correspond to frequencies for which the SDFT module in the DSSS receiver will generate Fourier coefficients. The SDFT module at the receiver may specifically consider the power spectral peaks of the preamble, which contain nearly all the preamble energy, as the sparse points for the Fourier transform calculation.

At block 920, a time domain preamble for a coded DSSS frame may be synthesized. A time domain signal corresponding to the synthesized preamble-codeword in the frequency domain may be generated, for example, using a DAC or by another method. The DAC may have a minimum required signal-to-noise and distortion ratio (SINAD) greater than the spectral contrast of the synthesized preamble-codeword (e.g., the synthesized codeword 120 or the synthesized codeword 210). One of ordinary skill in the art will appreciate that other methods of converting the frequency domain codeword to a time domain preamble may be used without departing from the scope of the present disclosure.

At block 930, the preamble may be prepended to a coded data stream. The data stream may be coded using pseudo-random binary sequences (PRBS) for spreading. The coded payload of the frame may be generated by multiplying each data-modulated symbol in the time domain by the multiple, fast 180-degree phase transitions within a single symbol duration defined by the data-codeword. The preamble may be prepended to the PRBS coded data stream to form a DSSS frame for transmission. At block 940, the DSSS frame with the prepended preamble may be transmitted.

In accordance with various aspects of the present disclosure, a new preamble-codeword may be synthesized to minimize the possibility of unintended detection/decoding of transmitted information. For example, a different preamble-codeword may be synthesized after a preamble-codeword has been used for a predetermined period of time. Alternatively, a different preamble-codeword may be synthesized after a preamble-codeword has been used for a predetermined number of transmitted frames. As a further alternative, a different preamble-codeword may be synthesized after a preamble-codeword has been used for a random period of time or a random number of transmitted frames.

It should be appreciated that the specific operations illustrated in FIG. 9 provide a particular method of generating a preamble for a DSSS signal according to an embodiment. Other sequences of operations may also be performed according to alternative embodiments. For example, alternative embodiments may perform the operations outlined above in a different order. Moreover, the individual operations illustrated in FIG. 9 may include multiple sub-steps that may be performed in various sequences as appropriate to the individual operation. Furthermore, additional operations may be added or removed depending on the particular applications. One of ordinary skill in the art would recognize many variations, modifications, and alternatives.

Figure 10:
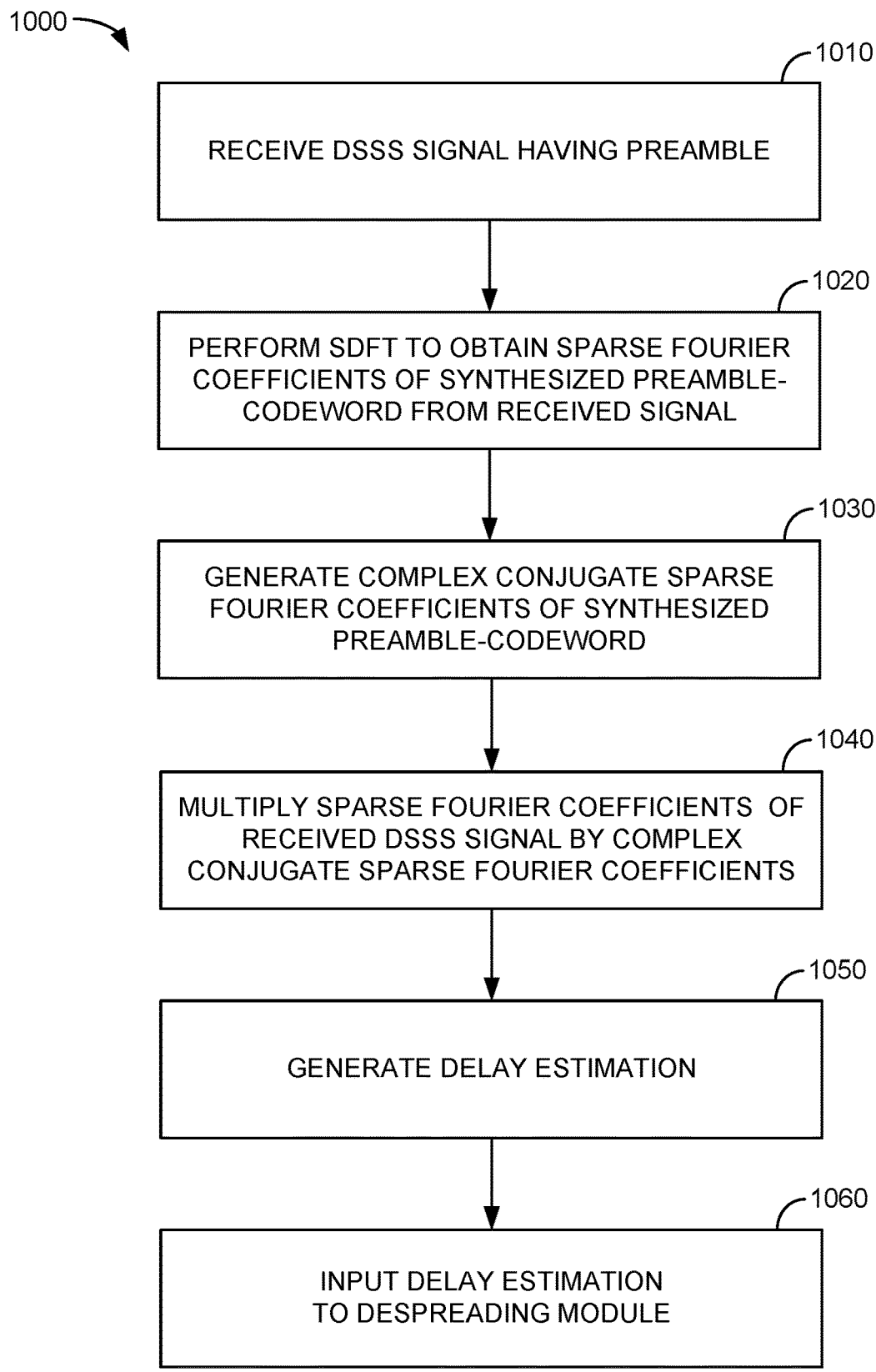
FIG. 10 is a flowchart of a method for decoding a DSSS signal with a synthesized preamble-codeword in accordance with various aspects of the present disclosure.

FIG. 10 is a flowchart illustrating a method 1000 for decoding a DSSS signal with a synthesized preamble-codeword in accordance with various aspects of the present disclosure. Referring to FIG. 10, at block 1010, a DSSS signal including a preamble may be received. At block 1020, an SDFT may be performed on the DSSS signal to obtain the sparse Fourier coefficients of the synthesized preamble-codeword in the frequency domain from the time domain preamble signal.

At block 1030, the complex conjugates of the sparse Fourier coefficients of the synthesized preamble-codeword may be generated. For example, a DSP module may calculate the complex conjugates of the sparse Fourier coefficients of the synthesized preamble-codeword that transmitter and receiver agreed to use in advance. At block 1040, the sparse Fourier coefficients of the coded data stream of the received DSSS signal may be calculated and multiplied by the complex conjugate of the sparse Fourier coefficients of the synthesized preamble-codeword. For example, at each frequency determined by the SDFT, the multiplier 524 in the fast code acquisition module 520 may multiply the sparse Fourier coefficients of the coded data stream of the DSSS signal calculated by the SDFT module 522 by the complex conjugates of the sparse Fourier coefficients of the synthesized preamble-codeword at that frequency. The multiplication may generate the Fourier transform of the cross-correlation between the received DSSS signal and the reference complex conjugates of the sparse Fourier coefficients of the preamble-codeword.

At block 1050, a delay estimation for the received DSSS signal may be generated by the fast code acquisition module 520 within a time scale that is approximately equal to the chip duration. For example, in some embodiments, the cross-correlation signal output of the multiplier 524 may be input to an iterative filter block 526. The iterative filter block 526 may apply an iterative filtering algorithm to the cross-correlation signal to generate a delay estimation. Alternatively, in some embodiments a Sparse inverse Discrete Fourier Transform (SiDFT) algorithm may be used to estimate delay. At block 1060, the delay estimation signal may be input to the despreading module 540 to synchronize decoding of the DSSS signal.

It should be appreciated that the specific operations illustrated in FIG. 10 provide a particular method of decoding a DSSS signal with a preamble according to an embodiment. Other sequences of operations may also be performed according to alternative embodiments. For example, alternative embodiments may perform the operations outlined above in a different order. Moreover, the individual operations illustrated in FIG. 10 may include multiple sub-steps that may be performed in various sequences as appropriate to the individual operation. Furthermore, additional operations may be added or removed depending on the particular applications. One of ordinary skill in the art would recognize many variations, modifications, and alternatives.

The methods 900 and 1000, respectively, may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for operating a direct sequence spread spectrum (DSSS) receiver, the method comprising:
   receiving a synthesized preamble codeword (c[n]);
   receiving a coded DSSS frame including the synthesized preamble codeword and a coded data stream;
   performing sparse discrete Fourier transform (SDFT) on the coded DSSS frame to produce sparse Fourier coefficients of the coded DSSS frame;
   generating complex conjugate SDFT coefficients (C*[K]) of the synthesized preamble codeword;
   multiplying the sparse Fourier coefficients of the coded DSSS frame by the complex conjugate SDFT coefficients of the synthesized preamble codeword to generate a Fourier transform of a cross-correlation between the coded DSSS frame and the synthesized preamble codeword;
   generating a delay estimation signal, wherein generating the delay estimation signal comprises applying an iterative filtering algorithm to the Fourier transform that is generated by multiplying the sparse Fourier coefficients of the coded DSSS frame by the complex conjugate SDFT coefficients of the synthesized preamble codeword; and
   despreading the coded DSSS frame.

2. The method of claim 1, wherein the complex conjugate SDFT coefficients of the synthesized preamble codeword are generated by performing SDFT on the synthesized preamble codeword.

3. The method of claim 1, further comprising using a different preamble codeword after the synthesized preamble codeword has been used for a predetermined period of time.

4. The method of claim 1, further comprising using the delay estimation signal as an input to a despreading module to synchronize decoding of the coded DSSS frame.

5. The method of claim 4, wherein the despreading module is operable to produce early and late coded signals to be used as an input for a fine tracking module.

6. The method of claim 5, further comprising using an output of the fine tracking module as an input for the despreading module to synchronize decoding of the coded DSSS frame.

\* \* \* \* \*